United States Patent
Yan et al.

(10) Patent No.: US 11,240,899 B2
(45) Date of Patent: Feb. 1, 2022

(54) AUTOMATIC ADDRESS ALLOCATION FOR SERIALLY CONNECTED DEVICES

(71) Applicant: SIGNIFY HOLDING B.V., Eindhoven (NL)

(72) Inventors: Caijie Yan, Eindhoven (NL); Changping Lu, Eindhoven (NL); Yangjing Pan, Eindhoven (NL); Weixi Zhou, Eindhoven (NL); Fangfang Zhu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/621,266

(22) PCT Filed: Jun. 5, 2018

(86) PCT No.: PCT/EP2018/064765
§ 371 (c)(1),
(2) Date: Dec. 11, 2019

(87) PCT Pub. No.: WO2018/228867
PCT Pub. Date: Dec. 20, 2018

(65) Prior Publication Data
US 2020/0137859 A1    Apr. 30, 2020

(30) Foreign Application Priority Data

Jun. 13, 2017  (WO) ................. PCT/CN2017/088139
Aug. 11, 2017  (EP) ..................................... 17185918

(51) Int. Cl.
*H05B 47/18*    (2020.01)
*H05B 45/30*    (2020.01)
*H04L 29/12*    (2006.01)

(52) U.S. Cl.
CPC ............. *H05B 47/18* (2020.01); *H04L 61/20* (2013.01); *H04L 61/6004* (2013.01)

(58) Field of Classification Search
CPC ..... H04L 12/40052; H04L 2012/40208; H04L 61/20; H04L 61/6004; H04L 29/12
See application file for complete search history.

(56) References Cited

U.S. PATENT DOCUMENTS

| 8,970,132 B2 | 3/2015 | Lin et al. | |
| 2013/0076256 A1* | 3/2013 | Yang ................... | H05B 45/30 315/201 |
| 2013/0278169 A1 | 10/2013 | Reinoso | |
| 2015/0256384 A1 | 9/2015 | Van Den Hurk et al. | |
| 2016/0081165 A1 | 3/2016 | Nakamura | |

FOREIGN PATENT DOCUMENTS

| CN | 105376916 A | 3/2016 | |
| WO | 2015144697 A1 | 10/2015 | |
| WO | 2016015998 A1 | 2/2016 | |
| WO | WO-2016015998 A1 * | 2/2016 | ............. H05B 47/19 |

* cited by examiner

*Primary Examiner* — Henry Luong

(57) ABSTRACT

The present invention relates to a method and system for automatic address allocation in serially connected controlled devices (e.g. luminaires) to achieve a changed control configuration. A signal adapter is modified to send an address sorting command, so that each of the controlled devices will automatically allocate an address to itself in sequence one by one upon receiving the address sorting command from the signal adapter.

7 Claims, 2 Drawing Sheets

| T | P |
|---|---|
| 0x5A | 0xFF |

| T | P |
|---|---|
| 0xA051 | 2 b (BE) |
| 0xA052 | 1 b |
| 0xA053 | 2 b (BE) |

AUTOMATIC ADDRESS ALLOCATION FOR SERIALLY CONNECTED DEVICES

CROSS-REFERENCE TO PRIOR APPLICATIONS

This application is the U.S. National Phase application under 35 U.S.C. § 371 of International Application No. PCT/EP2018/064765, filed on Jun. 5, 2018, which claims the benefits of European Patent Application No. 17185918.4, filed on Aug. 11, 2017 and Chinese Patent Application No. PCT/CN2017/088139, filed on Jun. 13, 2017. These applications are hereby incorporated by reference herein.

FIELD OF THE INVENTION

The invention relates to the field of address allocation for serially connected devices, such as—but not limited to—luminaire devices (e.g. DMX luminaires), for use in various different applications for home, retail and industry.

BACKGROUND OF THE INVENTION

DMX is a standard for digital communication networks. A DMX system contains a controller (transmitter) and receiver(s). The origin of the abbreviation of DMX is unknown. However, it is often explained as "Digital Multiplexed signal". DMX is a protocol, in which the DMX controller communicates to devices with DMX receivers. In other words, DMX is the language in which the DMX controller talks to the DMX receivers. Information is transferred by modulating two signal wires in opposite way, while ground potential is needed as a reference. An address needs to be allocated to each DMX receiver. This can be a number between "1" and "512" which cannot be changed via the DMX connection. More specifically, the related DMX standard USITT DMX512 is based on RS485 communication and was developed to replace multiplexed analog systems. Although RS485 is a two-way communication, this has not been implemented in DMX (which provides a one-way communication only). In DMX communication, no explicit address information is used, since a target address for data (e.g. a dedicated message) is implicitly derivable from the location of the data within a serial data stream. A DMX receiver thus simply counts the messages to extract a dedicated message.

Furthermore, Remote Device Management (RDM) is a protocol enhancement to USITT DMX512 that allows bi-directional communication between a lighting or system controller and attached RDM compliant devices over a standard DMX line. This protocol allows for configuration, status monitoring, and management of these devices in a way that does not disturb the normal operation of standard DMX512 devices that do not recognize the RDM protocol. The standard was originally developed by the Entertainment Services and Technology Association (ESTA) and is officially known as "ANSI E1.20, Remote Device Management Over DMX512 Networks".

Conventionally, DMX was used mainly for controlling lighting equipment and related accessories in entertainment applications (theatre, staging, concerts etc.). Recently, DMX is being used more frequently in architectural scene lighting applications and urban lighting projects due to its easy control and robust function. In this connection, ultra slim LED profiles or strips have been developed as DMX-controlled luminaires to provide increased flexibility for seamless integration with architectural structures. They are thus widely used in architectural lighting.

However, during the installation and usage, a lot of problems arise which need to be addressed. Media façade and edge lighting applications have been developed for such LED profiles. On one hand, for media façade applications, a high-resolution image needs to be displayed by the LED profiles. Recently, four kinds of dimension of LED profiles (i.e. 30 cm, 60 cm, 90 cm and 120 cm) have been developed for LED profiles. However, even the shortest size of 30 cm is still too long for providing color control in practical applications. Therefore, a higher number of available DMX channels (i.e. addresses) is needed. On the other hand, for edge lighting applications, less DMX channels (i.e. addresses) are needed to realize simple dynamic lighting effects.

SUMMARY OF THE INVENTION

It is an object of the present invention to provide more flexible address allocation for DMX receivers or other serially connected receivers.

Accordingly, an automatic address allocation can be provided for communication systems where a digital data stream is serially forwarded to a plurality of serially connected receiver devices and where each address is determined by a location of a data slot within the digital data stream. To achieve this, the data of data slots of the digital data stream is set to a predetermined data pattern in response to an address sorting command. The predetermined pattern may be any pattern known to the receiver devices and not reserved for other communication or control purposes. As an example, it can be a sequence of identical bit values, such as "00 . . . 0" or "111 . . . 1" in binary notation or "FF" in hexadecimal notation for an 8-bit pattern.

The digital data stream with the modified data is then forwarded to the plurality of serially connected receiver devices, where the predetermined data pattern in the digital data stream is detected and an address of a receiver device is set to a predetermined first data value (e.g. "01" in hexadecimal notation) if the predetermined data pattern has been detected in a first data slot of the digital data stream, or the address of the receiver device is set to a third data value derived from a second data value in a data slot preceding the first occurrence of the predetermined data pattern if the predetermined data pattern has not been detected in the first data slot of the digital data stream.

First occurrence of the predetermined data pattern means from data receiving point of view of receiver device, first received predetermined data pattern.

Thus, the control configuration of lighting or other address-based systems can be changed in a simple manner. Moreover, a function can be added to a signal adapter or adaptation function to send the address sorting command, so that the serially connected devices (e.g. luminaires) will automatically allocate an internal address to themselves in sequence one by one upon receiving the address sorting command from the signal adapter. Thereby, standard remote device management commands or other control commands can be changed by the signal adapter or adaptation function into an internal control protocol. Then, internal control commands can be sent to the connected devices (e.g. luminaires) by using the sequentially assigned internal address allocation of the connected devices (e.g. luminaires) for the internal control protocol. The proposed sorting-based address allocation is flexible and adaptive and requires low configuration work if any changes need to be introduced to connected devices. In case of any additional changes to the connected devices, the signal adapter merely needs to (re-) send an address sorting command.

A first aspect of the present invention is an apparatus for address allocation in a receiver device of a communication system where a digital data stream is serially forwarded to a plurality of serially connected receiver devices and where each address is determined by a location of a data slot within the digital data stream, the apparatus comprising a detection unit for detecting a received address sorting command with a predetermined data pattern in the digital data stream at the receiver device; and an address setting unit, responsive to the detection of the predetermined data pattern, for setting an address of the receiver device to a predetermined first data value if the predetermined data pattern has been detected in a first data slot of the digital data stream, or for setting the address of the receiver device to a third data value derived from a second data value in a data slot preceding the first occurrence of the predetermined data pattern if the predetermined data pattern has not been detected in the first data slot of the digital data stream.

According to a first option, the third data value for address setting may be derived by incrementing the second data value of the data slot preceding the first occurrence of the predetermined data pattern by one. This provides the advantage that each subsequent or neighboring receiver device simply needs to increment the last address of the previous device to derive its first own address, which allows easy implementation and fast processing.

According to a second option which can be combined with the first option, the address setting unit may be adapted to set a plurality of addresses for different channels of the receiver device. Thereby, several functions can be addresses at each receiver device. As an example, if the receiving device comprises a luminaire device, the different channels can be assigned to at least one of respective different pixels and respective different colors.

According to a third option which can be combined with the first or second option, the apparatus may be adapted to overwrite the data slot of the first occurring predetermined data pattern with the derived data value and to forward the digital data stream with the overwritten data slot to a neighboring one of the receiver devices. Thereby, the neighboring receiver can automatically derive its new address(es) from the data value in the data slot of the preceding receiver device in the chain of serially connected receiver devices.

A second aspect of the present invention is an apparatus for address allocation in a communication system where a digital data stream is serially forwarded to a plurality of serially connected receiver devices and where each address is determined by a location of a data slot within the digital data stream, the apparatus comprising a signal adapter unit for modifying the data of data slots of the digital data stream to a predetermined data pattern in response to a received address sorting command and for forwarding the digital data stream with the modified data to the plurality of serially connected receiver devices.

According to a fourth option which can be combined with any one of the first aspect and first to third options, the signal adapter unit may be adapted to send a command to a designated one of the receiver devices by using an address allocated in response to the address sorting command. Thus, an internal control protocol with own flexible addressing options can be used between the signal adapter unit and the receiver devices. After the proposed address sorting process has been finalized, dedicated configuration commands can be sent by the signal adapter unit to individual devices to configure segment and/or channel numbers by using the internal protocol.

According to a fifth option which can be combined with any one of the first aspect and the first to fourth options, the predetermined data pattern may be a sequence of identical bit values. This provides the advantage that the predetermined data pattern can be generated by a simple reset operation by which all bits are reset to the same bit value.

A third aspect of the present invention is an apparatus for address allocation in a communication system where a digital data stream is serially forwarded to a plurality of serially connected devices and where each address is determined by a location of a data slot within the digital data stream, the apparatus comprising an address allocation control unit for generating an address sorting command and for forwarding the address sorting command to a signal adapter unit.

According to a sixth option which can be combined with any one of the first and second aspects and the first to fifth options, the communication system may be a DMX system with Remote Device Management, RDM, enhancement.

A fourth aspect of the present invention is a system for address allocation in a communication system where a digital data stream is serially forwarded to a plurality of serially connected devices and where each address is determined by a location of a data slot within the digital data stream, the system comprising a controller with an apparatus of the third aspect, a signal adapter with an apparatus of second aspect, and a plurality of receiver devices each comprising an apparatus of the first aspect.

According to a seventh option which can be combined with any one of the first to third aspects and the first to sixth options, the plurality of receiver devices may be luminaire devices of a lighting system.

A fifth aspect of the present invention is a luminaire device comprising an apparatus of the first aspect.

A sixth aspect of the present invention is a method of allocating an address in a communication system where a digital data stream is serially forwarded to a plurality of serially connected receiver devices and where each address is determined by a location of data within the digital data stream, the method comprising generating an address sorting command; modifying the data of data slots of the digital data stream to a predetermined data pattern in response to the address sorting command; and forwarding the digital data stream with the modified data to the plurality of serially connected receiver devices.

A seventh aspect of the present invention is a method of allocating an address in a receiver device of a communication system where a digital data stream is serially forwarded to a plurality of serially connected devices and where each address is determined by a location of data within the digital data stream, the method comprising detecting a predetermined data pattern in the digital data stream; and responsive to the detection of the predetermined data pattern, setting an address of the receiver device to a predetermined first data value if the predetermined data pattern has been detected in a first data slot of the digital data stream, or setting the address of the receiver device to a third data value derived from a second data value in a data slot preceding the first occurrence of the predetermined pattern if the predetermined data pattern has not been detected in the first data slot of the digital data stream.

An eighth aspect of the present invention is a computer program product comprising code means for producing the steps of the method the sixth aspect or the method of the seventh aspect when run on a computer device.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall further be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a DMX lighting control system for allocating channel addresses to luminaire devices with a plurality of light emitting diodes (LEDs) for providing enhanced lighting effects.

Figure 1:
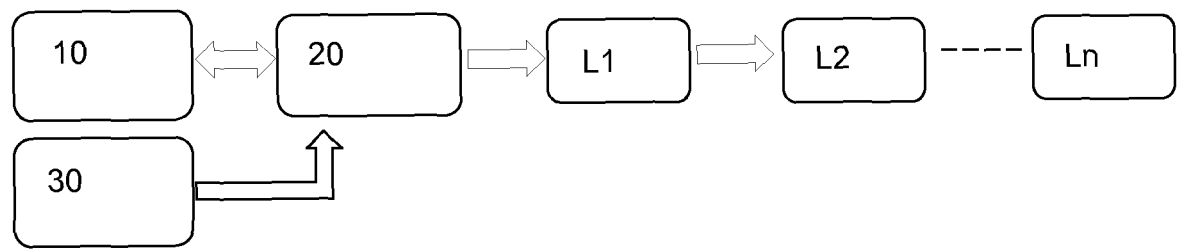
FIG. 1 shows a schematic architecture of an address allocation system with a plurality of serially connected devices according to various embodiments.

FIG. 1 shows a schematic architecture of an address allocation system with a plurality of serially connected devices according to various embodiments.

In the system of FIG. 1, a DMX control signal is sent from a DMX controller 30 to a signal adapter 20 in order to control dimming level or color of a plurality of flexible luminaires L1-Ln with adjustable segments/channels. More specifically, the DMX controller 30 sends a two-line D+/D− signal to the signal adapter 20 which sends one wired signal (Rx) as a serial digital data stream to the luminaires L1-Ln which can be configured by software applications to different addresses (e.g. 1-n addresses). Therefore, no hardware modification is needed.

More and more parameters like channel and/or segment number, brightness changing curve, etc. could be configured and/or changed after installation. To achieve this, an RDM controller 10 is connected to the signal adapter 20 for configuration control purposes by using the RDM protocol.

The DMX controller 30 and the RDM controller 10 could be implemented in one physical device or alternatively separately devices.

According to various embodiments, an automatic and flexible address sorting process is provided based on flexible luminaires L1-Ln controlled by an RDM signal for luminaire configuration. In the embodiments, a segment or called pixel has the meaning of one addressable light unit and might include e.g. four channels for different colors R (red), G (green), B (blue) and W (white). Here, channel means DMX channel.

More specifically, an enhanced control option for configuration change in lighting control is provided, which can be implemented in the luminaire firmware. Also, a new function could be added to the signal adapter 20 to send an address sorting command, so that each of the luminaires L1-Ln will automatically allocate an address to itself in sequence one by one upon receiving the address sorting command from the signal adapter 20. Thereby, the circuit structure can be designed with adjusted DMX channel number to realize a fine color control and edge lighting within luminaires with LED profiles.

The signal adapter 20 has a unique user identity (UID) for RDM communication with the RDM controller 10, receives standard RDM control commands from the RDM controller 10 and changes the received standard RDM control commands into internal RDM control protocol commands. The signal adapter 20 sends the internal RDM control commands as a serial digital data stream to the connected luminaires L1-Ln. The internal address(es) of the connected luminaires L1-Ln for the RDM protocol is assigned in a sequential manner in response to the address sorting command.

After address sorting, the RDM controller 10 can send a configuration command to configure segment numbers and/or channel numbers by using the RDM protocol.

As an example, for a luminaire with pixel number of 4 and RGB control, i.e. the color number is 3, the physical channel number N is 12, i.e. a total of 12 color slots, where Np is calculated as follows:

$$Np = \text{Pixel Number} * \text{Color Number}$$

However, the DMX channel number to be used is configurable. The value of N should be an integer multiple of the color number, so that a reasonable mapping is obtained. Assuming a DMX channel number of 6 in this case, the color mapping can be as follows:

R1 G1 B1 R2 G2 B2 R1 G1 B1 R2 G2 B2, or alternatively as

R1 G1 B1 R1 G1 B1 R2 G2 B2 R2 G2 B2

An advantage of the proposed configuration control is that the parameters of color depend on the configuration of the lighting project. There is thus no need to change the application control structure, e.g. its firmware or hardware. Rather, just a minor configuration change is needed for implementing new lighting projects. Thereby, design and test efforts can be minimized.

Figure 2:
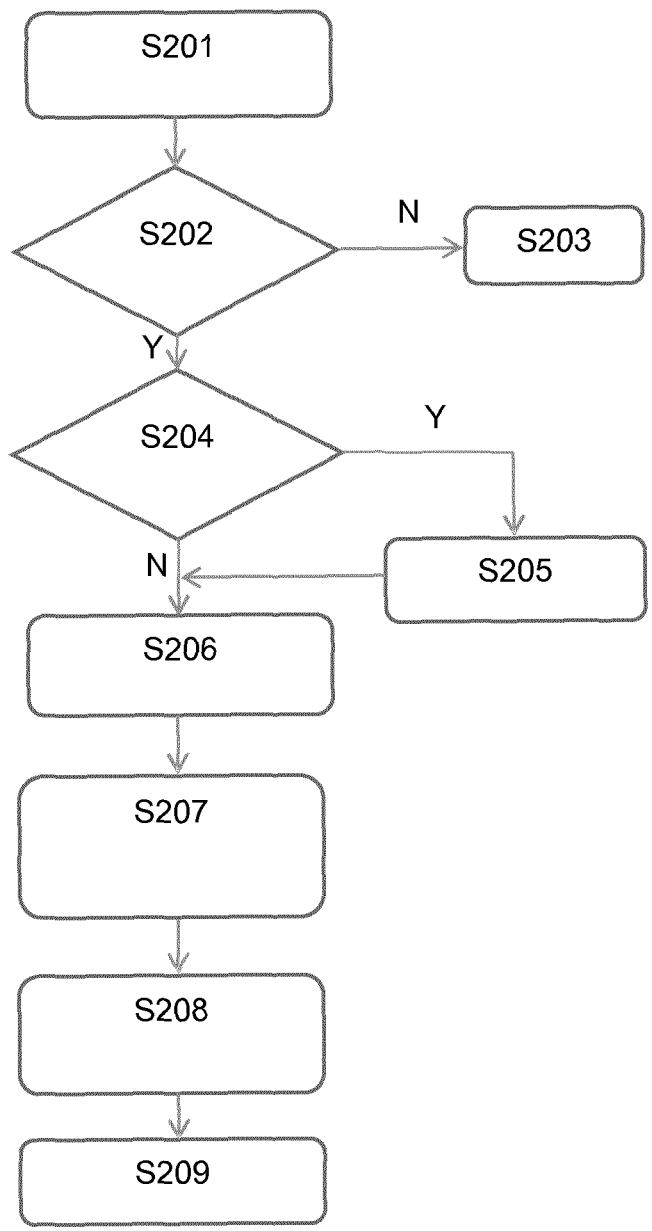
FIG. 2 shows a flow diagram of an address allocation procedure according to a first embodiment.

FIG. 2 shows a flow diagram of an automatic address allocation procedure for configuration purposes according to a first embodiment, where all connected luminaries L1-Ln can retrieve a correct sorting index (i.e. channel address) automatically after they have received the address sorting command.

When the signal adapter 20 of FIG. 1 initializes the address sorting command in step S201, it sends out a predetermined data pattern (e.g. a value of "FF" in hexadecimal notation, which means "11111111" in binary notation) in data slots of a frame of a serial data stream to the connected luminaires L1-Ln.

Once a luminaire receives the frame of the data stream, it checks the value in the data slots in step S202. More specifically, it searches for the predetermined data pattern until it reaches the end of the frame. If the pattern it does not find the predetermined pattern, the procedure branches off to step S203 and no automatic address allocation is initiated at the luminaire. Otherwise, if the predetermined pattern is detected in a data slot, the procedure proceeds to step S204 where it is checked whether the predetermined pattern has been detected in the first data slot. If so, the procedure branches off to step S205, where the last data value is set to "00" in hexadecimal notation (i.e., "00000000" in binary notation), and then proceeds to step S206. Otherwise, if the predetermined data pattern has not been detected in the first data slot, the procedure directly proceeds to step S206 where the value of the last data (which corresponds to the data value in the slot directly preceding the first slot with the predetermined pattern) is incremented by one (i.e. add 1 to the data value) to obtain a new data value for the respective channel address (sorting index). Then, the procedure proceeds to step S207 where the slot with the predetermined data pattern is overwritten by the obtained new data value. In the next step S208, the modified frame of the data stream is send out to the next device (i.e. luminaire). Finally, the procedure ends in step S209.

Thus, if the first "FF" byte (predetermined pattern) is found in the frame, the luminaire stores the value in the previous slot as last data value and marks (overwrites) the subsequent slot (occupied with the first "FF" byte) with the calculated new value, which equals the stored last data value incremented by 1. Meanwhile, the luminaire stores the new value to a nonvolatile storage as new channel address (sorting index).

It is noted that in the following description and figures, the prefix "0x" in commands or frames indicates that the subsequent symbols represent a number in hexadecimal notation.

Figures 3, 4, 5:
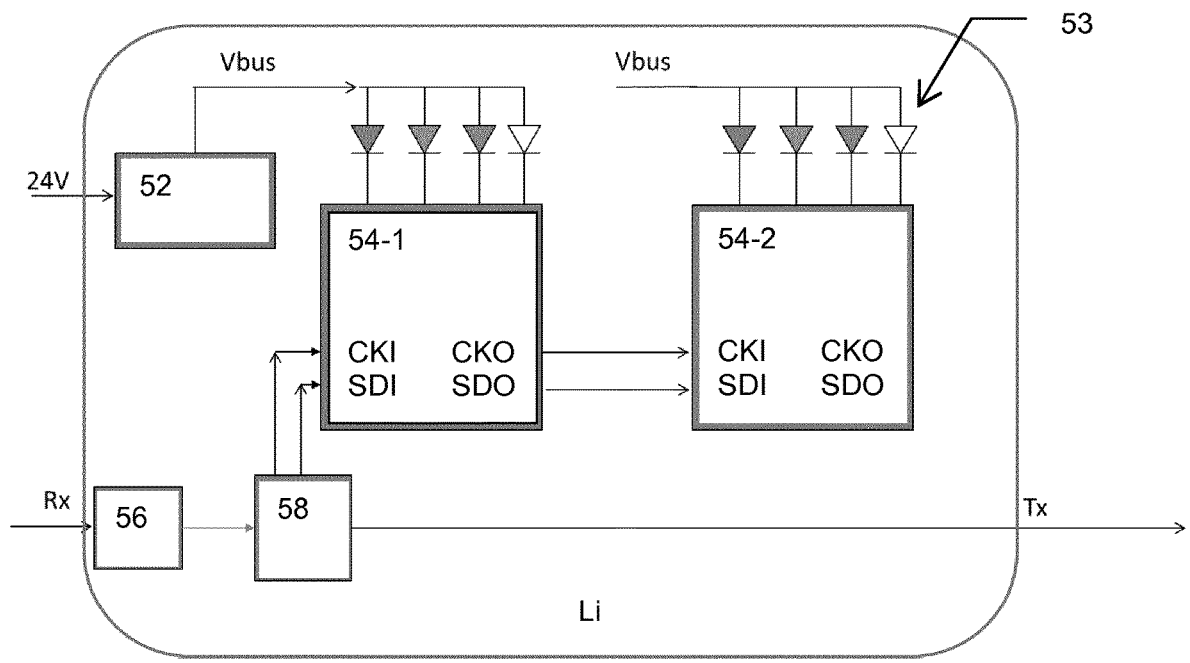
FIG. 3 shows an example of an address sorting command that can be used in various embodiments.
FIG. 4 shows examples of different control commands to designated devices.
FIG. 5 shows a schematic circuit diagram of a luminaire device with address allocation function according to a second embodiment.

FIG. 3 shows an example of the proposed address sorting command that can be used in various embodiments. Here, a new command type (T) "5A" with a payload (P) set to the predetermined pattern "FF" can be defined for luminaire address sorting. The description of the command could be "fill in all slots in the DMX line". Once each connected luminaire has allocated its unique address (sorting index), the signal adapter 20 can be used to send various of commands to a designated luminaire via the standard RDM protocol.

FIG. 4 shows examples of different control commands to designated devices. A first control command type "A051" with a two-byte (2b) payload in big-endian (BE) format can be used to set the color number of an addressed luminaire. Here, endianness refers to the sequential order used to describe the order of byte transmission over a digital link. Words may be represented in big-endian or little-endian format, depending on whether bits or bytes or other components are numbered from the big end (most significant bit) or the little end (least significant bit). Thus, when sending data bytewise in big-endian format, the most significant byte, which is the byte containing the most significant bit, is sent first and the following bytes are sent in decreasing significance order with the least significant byte, which is the byte containing the least significant bit, thus being sent in last place.

Furthermore, a second control command type "A052" with a one-byte (1b) payload can be used to set the pixel number of an addressed luminaire.

Finally, a third control command type "A053" with a two-byte (2b) payload in big-endian (BE) format can be used to set the number of occupied slots of an addressed luminaire.

In the following, a more specific example of the address allocation or sorting procedure for changing a control configuration is described with reference to specific commands or frames of the RDM protocol based on the example of FIG. 3 and other examples of control commands not shown in FIG. 4. It is assumed that the UID of the signal adapter 29 is "15680001" in hexadecimal notation and the UID of the RDM controller 10 is "15680002" in hexadecimal notation. Typically, the receiver reads the type field first to recognize the type of the data frame.

In a first step, the RDM controller 10 issues an address sorting command (e.g. type "A060" in hexadecimal notation) to the signal adapter 20, which looks as follows:

| Type | Source | Destination | Command | Payload |
|---|---|---|---|---|
| 0xCC | 0x15680002 | 0x15680001 | 0xA060 | NA |

Then, in a second step, the signal adapter 20 receives the address sorting command and start the address sorting procedure for the luminaires L1-Ln by sending the following data frame with type "5A" and predetermined pattern "FF" in each data slot to instruct the connected luminaires L1-Ln to start an address sorting procedure.

| Type | Payload (512 bytes) |
|---|---|
| 0x5A | 0x FF FF FF FF FF FF . . . |

In a subsequent third step, the first luminaire L1 (which has 3 channels allocated) processes the address sorting command in the above described manner and sends the following modified data frame to the next luminaire L2:

| Type | Payload (512 bytes) |
|---|---|
| 0x5A | 0x 01 01 01 FF FF FF . . . |

Then, in a fourth step, the second luminaire L2 (which has 3 channels allocated) processes the address sorting command and sends the following data frame to the next luminaire L3:

| Type | Payload (512 bytes) |
|---|---|
| 0x5A | 0x 01 01 01 02 02 02 FF FF FF FF . . . |

The above step is repeated until the address sorting command has been processed by the last luminaire Ln.

In an alternative embodiment, each luminaire could be adapted to overwrite only one byte as address regardless of the channel number of the luminaire.

Then, in a later step, the RDM controller 10 issues the following channel change command (e.g. type "A070" in hexadecimal notion) to the signal adapter 20 for the first luminaire 1 to change its channel address to "6":

| Type | Source | Destination | Command | Payload |
|---|---|---|---|---|
| 0xCC | 0x15680002 | 0x15680001 | 0xA070 | 00 00 00 01 00 06 |

In response thereto, the signal adapter 20 forwards the following command to the first luminaire L1:

| Type | Source | Destination | Command | Payload |
|---|---|---|---|---|
| 0xCC | 0x15680001 | 0x00000001 | 0xA070 | 00 06 |

Accordingly, the first luminaire L1 receives the command and change its channel address. Thus, a new channel address is allocated to and stored in the first luminaire L1 so that their LED(s) is/are controlled in line with the new channel number.

In another example, the RDM controller 10 issues the following segment change command (type "A071" in hexadecimal notation) to the signal adapter 20 in order to change the segment count of the third luminaire L3 to a value of 4:

| Type | Source | Destination | Command | Payload |
|---|---|---|---|---|
| 0xCC | 0x15680002 | 0x15680001 | 0xA071 | 00 00 00 03 00 04 |

In response thereto, the signal adapter 20 forward the following command towards the third luminaire L3:

| Type | Source | Destination | Command | Payload |
|---|---|---|---|---|
| 0xCC | 0x15680001 | 0x00000003 | 0xA071 | 00 04 |

When the first luminaire L1 receives the above command, it changes the source address and forwards the following command to the next luminaire:

| Type | Source | Destination | Command | Payload |
|---|---|---|---|---|
| 0xCC | 0x00000001 | 0x00000003 | 0xA071 | 00 04 |

When the second luminaire L2 receives the above command, it changes the source address and forwards the following command to the next luminaire:

| Type | Source | Destination | Command | Payload |
|---|---|---|---|---|
| 0xCC | 0x00000002 | 0x00000003 | 0xA071 | 00 04 |

When the third luminaire L3 receives the command, it detects that the destination address is same as its own address and changes its own segment number, as instructed. Thus, a new segment number is allocated to and stored in the third luminaire L3 and its LEDs are controlled as expected.

If after a change of segment number or channel number of a luminaire, a new address sorting is needed or not, depends on the DMX control data transmission mechanism.

For one type of DMX control data transmission, when a luminaire receives DMX control data (e.g. Type "00"), the luminaire will take the data which belongs to it (e.g. always the first N bytes of the payload, where N is the channel number of the luminaire), and forwards the rest of the data to next luminaires. In this situation, a new address sorting is not needed in case of segment/channel number change of a luminaire.

For another type of DMX control data transmission, the DMX controller may notify each luminaire to take payload data at a certain position as the control data to the luminaire. In this situation, in case of segment/channel change of a luminaire, a new address sorting is needed.

FIG. 5 shows a schematic circuit diagram of a luminaire device Li with address allocation function according to a second embodiment.

In the luminaire Li, a receiving signal Rx (D+/D−) is input to a 3-state transceiver device 56 (e.g. an integrated circuit 74AC245) which processes the received signal to obtain a 1-state signal and forwards the processed signal to a microcontroller unit (MCU) 58 which operates in accordance with a configuration which has been set by RDM control commands as described above. Based on the control configuration set at the luminaire Li, the MCU 58 sends a clock input (CKI) signal and a serial data input (SDI) signal of a serial peripheral interface (SPI) to a first multi-channel LED driver 54-1 which outputs a clock output (CKO) signal and a serial data output (SDO) signal to be used as corresponding input signals (CKI and SDI) of a second multi-channel LED driver 54-2, wherein each of the multi-channel LED drivers 54-1 and 54-2 is adapted to control a different channel address with respective LEDs 53 of different colors e.g. for respective pixels of the luminaire Li. The LEDs 53 are powered by a supply voltage Vbus generated by a DC/DC converter 52 from a supply voltage of e.g. 24V.

The MCU 58 sets the two addresses in the serial data stream according to the above automatic address allocation scheme and sends the modified data stream as transmission signal Tx to the next luminaire.

To summarize, a method and system for automatic address allocation for serially connected controlled devices (e.g. luminaires) to achieve a changed control configuration has been described. A signal adapter is modified to send an address sorting command, so that each of the controlled devices will automatically allocate an address to itself in sequence one by one upon receiving the address sorting command from the signal adapter.

While the invention has been illustrated and described in detail in the drawings and foregoing description, such illustration and description are to be considered illustrative or exemplary and not restrictive. The invention is not limited to the disclosed embodiments. The proposed address allocation solution can be implemented in various lighting systems or other communication systems with serially connected addressable receiver devices which are controlled by a serial data stream.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIG. 2 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A microcontroller unit for address allocation for a receiver device of a communication system comprising a plurality of receiver devices which are connected serially with each other, the microcontroller unit configured to:
   detect a received digital data stream as an address sorting command with a predetermined data pattern at the receiver device;
   responsive to the detection of the predetermined data pattern, if the predetermined data pattern has been detected in a first data slot of the digital data stream, set an address of the receiver device to a predetermined first data value; and
   responsive to the detection of the predetermined data pattern, if the predetermined data pattern has not been detected in the first data slot of the digital data stream, set the address of the receiver device to a third data value derived from a second data value in a data slot preceding a first occurrence of the predetermined data pattern;
   wherein the microcontroller unit is adapted to overwrite the data slot of the first occurring predetermined data pattern with the derived third data value and to forward the digital data stream with the overwritten data slot to a neighboring one of the receiver devices.

2. The microcontroller unit of claim 1, wherein the address setting unit is adapted to derive the third data value by incrementing the second data value by one.

3. The microcontroller unit of claim 1, wherein the address setting unit is adapted to set a plurality of addresses for different channels of the receiver device.

4. A luminaire device comprising the microcontroller unit of claim 1.

5. A remote device management (RDM) controller for address allocation for a communication system, the RDM controller configured to generate an address sorting command and to forward the address sorting command to a signal adapter unit, wherein the signal adapter unit is configured to transmit the address sorting command to a receiver device, the receiver device configured to:
   detect a received digital data stream as an address sorting command with a predetermined data pattern at the receiver device;
   responsive to the detection of the predetermined data pattern, if the predetermined data pattern has been detected in a first data slot of the digital data stream, set an address of the receiver device to a predetermined first data value; and
   responsive to the detection of the predetermined data pattern, if the predetermined data pattern has not been detected in the first data slot of the digital data stream, set the address of the receiver device to a third data value derived from a second data value;
   wherein the receiver device is adapted to overwrite the data slot of the first occurring predetermined data pattern with the derived third data value and to forward the digital data stream with the overwritten data slot to a neighboring one of the receiver devices.

6. A system for address allocation, the system comprising the RDM controller of claim 5 and a plurality of receiver devices.

7. The system of claim 6, wherein the plurality of receiver devices are luminaire devices of a lighting system.

* * * * *